United States Patent [19]

Everett

[11] Patent Number: 4,690,172

[45] Date of Patent: Sep. 1, 1987

[54] FOLDABLE DUAL-SEAL NOZZLE DAM

[75] Inventor: James W. Everett, New Stanton, Pa.

[73] Assignee: Westinghouse Electric Corp., Pittsburgh, Pa.

[21] Appl. No.: 809,708

[22] Filed: Dec. 17, 1985

[51] Int. Cl.[4] ............................................. F16L 55/12
[52] U.S. Cl. ..................................... 138/89; 220/232; 376/204
[58] Field of Search ....................... 138/89, 90, 92, 93, 138/94, 97; 220/200, 212, 232, 244; 277/204; 376/204

[56] References Cited

U.S. PATENT DOCUMENTS

| | | | |
|---|---|---|---|
| 4,482,076 | 11/1984 | Wentzell | 220/232 |
| 4,483,457 | 11/1984 | Schukei et al. | 220/232 |
| 4,518,015 | 5/1985 | Fischer | 138/93 |

OTHER PUBLICATIONS

Westinghouse Electric Corporation Drawings No. 1474E13 (2 sheets) and 1474E16, filed 9-17-84.
"Steam Generator Nozzle Dams for Primary Head Activities", Lewis & Woods, American Society of Mechanical Engineers, Mar. 12, 1980.

Primary Examiner—Stephen Marcus
Assistant Examiner—Mark Thronson
Attorney, Agent, or Firm—L. A. DePaul

[57] ABSTRACT

A nozzle dam for providing a fluid-tight seal across a primary fluid nozzle in the plenum of a nuclear steam generating vessel includes two fluid-impermeable seals, each comprising a circular three-section foldable seal plate covered with a flexible diaphragm and circumferentially encompassed by an inflatable seal member disposable in frictional sealing engagement with the inner surface of the nozzle. The center sections of the two seals are interconnected by tubular coupling means. The diaphragms are disposed on the high pressure sides of the seal plates, and the sections of each seal plate are hinged on the high pressure side. The center section of each seal plate carries two pairs of support tabs attached to the low pressure side thereof and respectively projecting from opposite ends thereof in cantilever fashion for supported engagement with a frustoconical portion of the inner surface of the nozzle.

10 Claims, 4 Drawing Figures

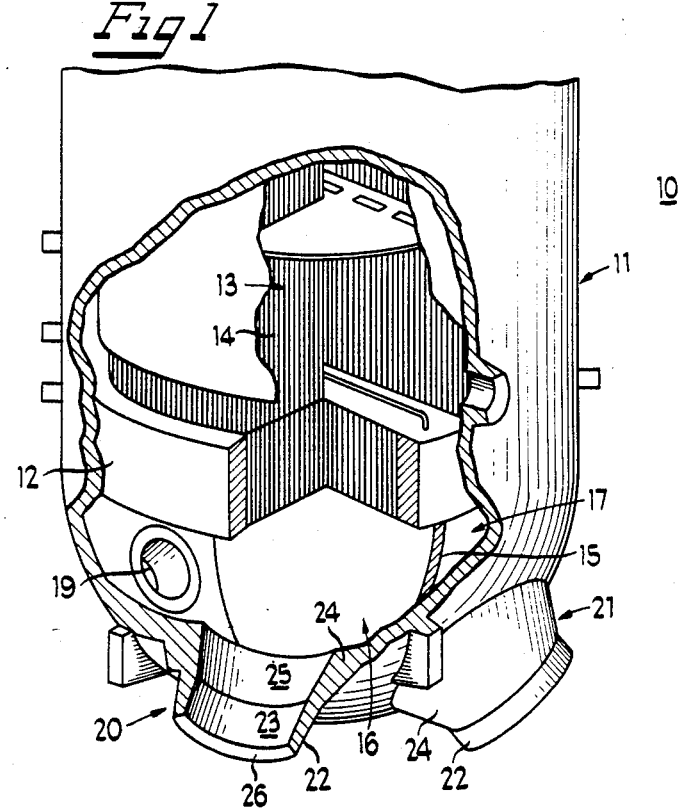

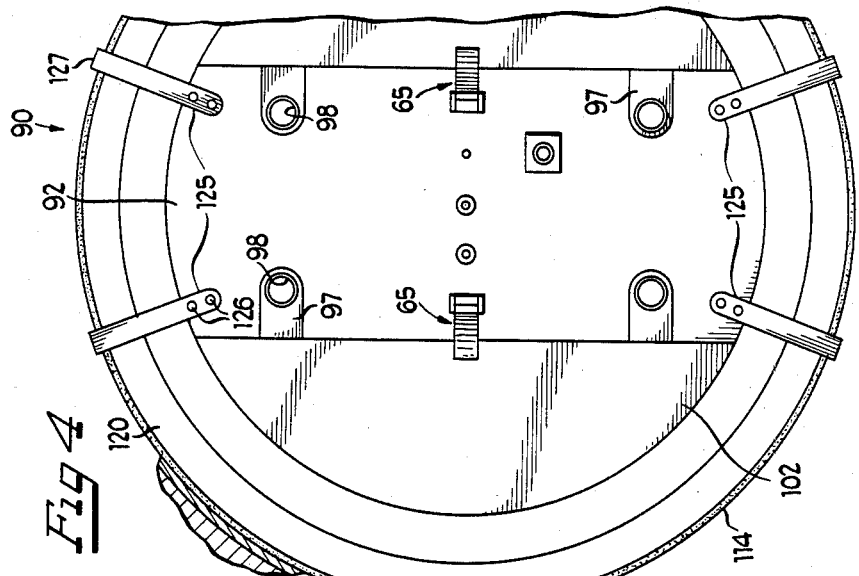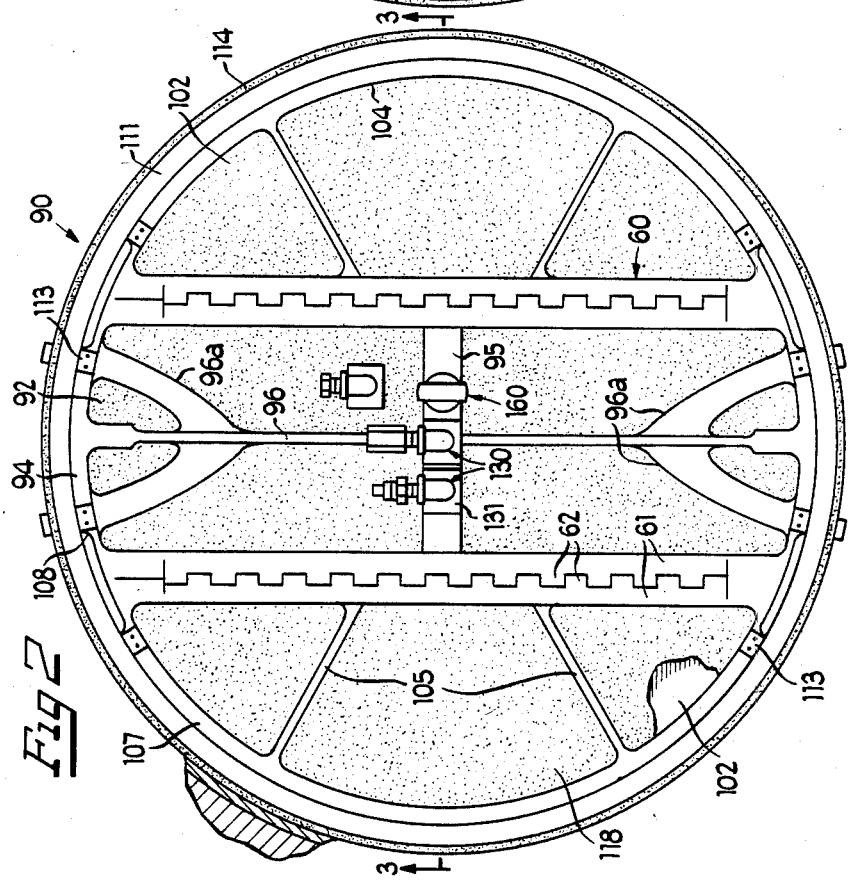

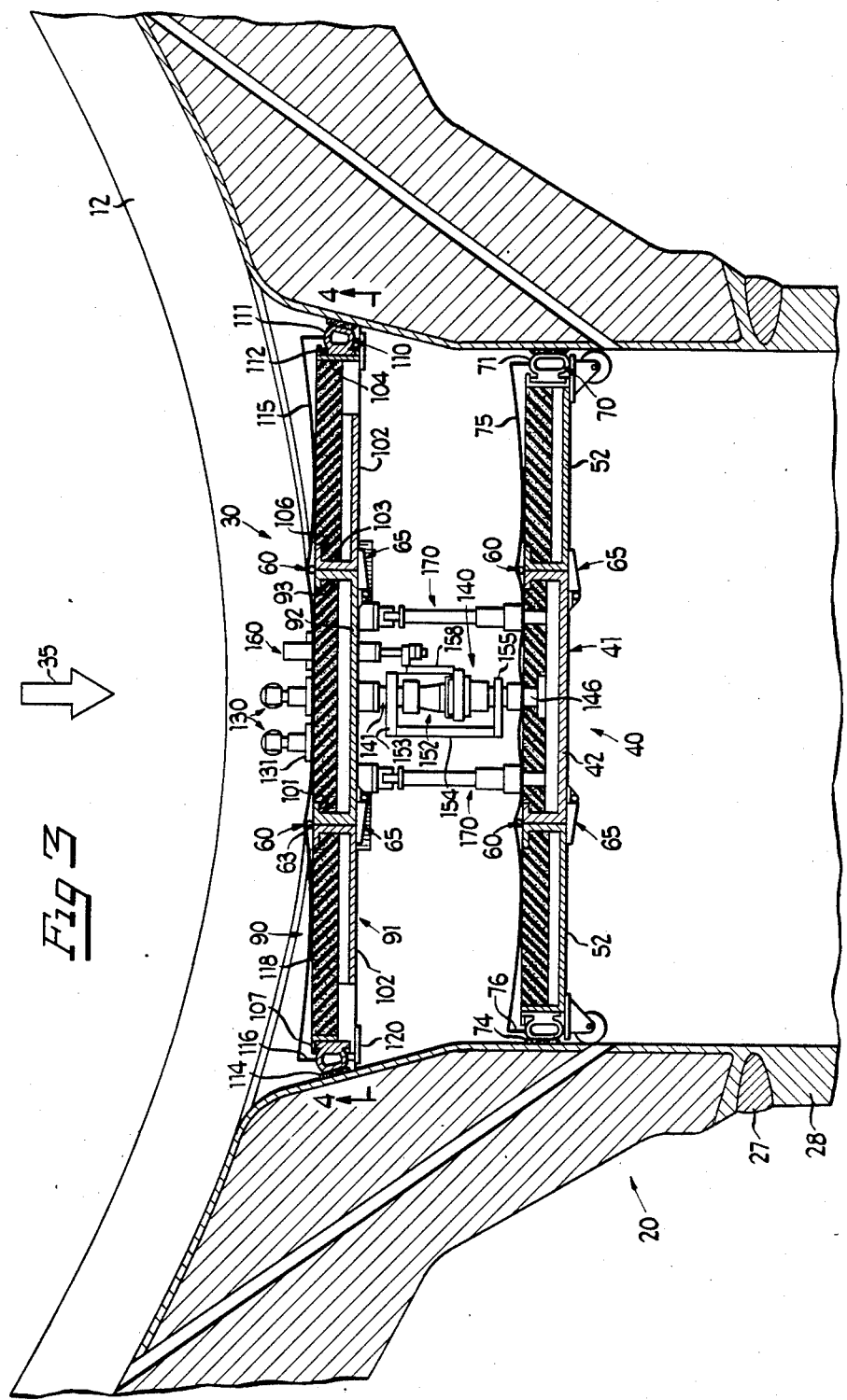

FOLDABLE DUAL-SEAL NOZZLE DAM

BACKGROUND OF THE INVENTION

1. Field of the Invention

The present invention relates to devices for providing a fluid-tight seal or block in a tubular member, such as a conduit or a nozzle or the like. The invention has particular application to providing a dam or seal in the primary fluid nozzles of a nuclear steam generator.

2. Description of the Prior Art

The present invention is an improvement of the nozzle dam disclosed in the copending U.S. application Ser. No. 651,419, the disclosure of which is incorporated herein by reference. It has been found that in that nozzle dam the seal membrane or diaphragm on the upper or inner seal, i.e., the one closest to the inside of the plenum, becomes flexed and stressed in use as a result of the pressure differential across the seal. This flexure and stressing of the diaphragm is the result of the fact that, since the diaphragm is disposed on the low pressure side of the upper seal, it is essentially unsupported whereas, in contrast, the membrane on the lower seal is supported by the foldable seal plate or base which prevents undue flexure and stress of that lower diaphragm.

The membrane cannot, however, be simply moved to the high pressure side of the seal, since this would prevent folding of the seal plate sections, which are hinged on the low pressure side, so that the sections will not tend to fold up when the inner seal is urged by the pressure differential into wedge-fitted engagement with the frustoconical portion of the inner surface of the nozzle.

SUMMARY OF THE INVENTION

It is a general object of the present invention to provide an improved nozzle dam seal means of the type which utilizes a foldable seal plate or base and a membrane, which avoids the disadvantages of prior such nozzle dams while affording additional structural and operating advantages.

An important object of the present invention is the provision of a nozzle dam of the type set forth which affords improved leak resistance.

In connection with the foregoing object, it is another objection of this invention to provide a nozzle dam of the type set forth, which effectively prevents excessive flexure and stress of the seal membrane.

Still another object of the invention is the provision of a nozzle dam of the type set forth which affords complete support for the seal membrane without interfering with the foldability of the base plate or the stable support thereof in the nozzle.

These and other objects of the invention are attained by providing a nozzle dam for preventing fluid flow under pressure through a primary fluid nozzle in the plenum of a nuclear steam generating vessel, wherein the nozzle has an inner surface, the nozzle dam comprising: first and second seal means disposable in sealing conditions axially spaced-apart within the nozzle, coupling means interconnecting the first and second seal means in the sealing conditions thereof, each of the seal means in the sealing condition thereof extending across and closing the nozzle, each of the seal means including bearing means frictionally engageable with the inner surface of the nozzle around the entire circumference thereof when the seal means is disposed in its sealing condition, and each of the seal means including a base and a flexible fluid-impervious seal sheet disposable in use on the high pressure side of the base for support thereby against deflection and stress, each of the seal sheets cooperating with the associated base and bearing means to form a fluid-tight seal.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary perspective view of the lower end of a nuclear steam generator vessel of the type in which the present invention is to be used, with portions broken away more clearly to show the internal construction;

FIG. 2 is an enlarged, fragmentary, sectional view, taken through one of the nozzles in FIG. 1 perpendicular to the nozzle axis, and illustrating the inner side of the nozzle dam of the present invention disposed in its sealing condition in plan view with the diaphragm removed;

FIG. 3 is a sectional view taken generally along the line 3—3 in FIG. 2, illustrating the nozzle dam in its installed position; and FIG. 4 is a fragmentary view taken generally along the line 4—4 in FIG. 2, and illustrating the bottom of the inner seal of the nozzle dam.

DESCRIPTION OF THE PREFERRED EMBODIMENT

The nozzle dam of the present invention is, to a large extent, identical in construction with that disclosed in the aforementioned copending U.S. application Ser. No. 651,419 and the same reference numerals are used in both applications for corresponding structure, however only so much of the common structure will be described in detail herein as is necessary for complete understanding of the present invention.

Referring to FIG. 1, there is illustrated a portion of a nuclear steam generator plant, generally designated by the numeral 10, including a vessel 11 having a generally part-spherical lower end which is separated from the upper end thereof by a horizontally disposed tube sheet 12. Mounted on the tube sheet 12 is a tube bundle 13, including a plurality of generally inverted U-shaped tubes 14, having the lower ends thereof disposed through complementary bores in the tube sheet 12. The portion of the vessel 11 below the tube sheet 12 is divided by a wall 15 into an inlet plenum 16 and an outlet plenum 17, which respectively communicate with the two vertical portions of the tubes 14. Formed in the vessel 11 are manways 19 (one shown), respectively providing access to the inlet and outlet plenums 16 and 17. Also respectively communicating with the inlet and outlet plenums 16 and 17 and projecting outwardly from the vessel 11 are two nozzles 20 and 21, each having an outer cylindrical portion 22 having a cylindrical inner surface 23, and an inner frustoconical portion 24 having a frustoconical inner surface 25. The outer end of each of the nozzles 20 and 21 defines an annular end wall 26 which is adapted to be secured, as by a suitable weldment 27 (see FIG. 3), to an associated conduit 28 which extends to an associated nuclear reactor vessel (not shown).

In general, at least two types of nozzles are provided in existing steam generator vessels. One type has a relatively long cylindrical portion 22 and a relatively short frustoconical portion 24, this type being exemplified by the nozzle 20. Another type has a relatively short cylindrical portion 22 and a relatively long frustoconical portion 24, this type being exemplified by the nozzle 21. Normally, both of the nozzles on the vessel 11 will be of the same type, but both types have been shown in FIG. 1 for purposes of illustration.

Referring now to FIG. 3 of the drawings, there is illustrated a nozzle dam, generally designated by the numeral 30, constructed in accordance with and embodying the features of the present invention. The nozzle dam 30 includes outer and inner seal assemblies 40 and 90, interconnected by a coupling assembly 140 and a plurality of support post assemblies 170. The nozzle dam 30 is adapted to be disposed in a nozzle 20 or 21, with the outer seal assembly 40 closing the outer cylindrical portion 22 and with the inner seal assembly 90 closing the inner frustoconical portion 24. While, for purposes of illustration, the nozzle dam 30 has been shown in a nozzle of the type represented by the nozzle 20, it will be appreciated that it can also be used in nozzles of the type represented by the nozzle 21, in exactly the same manner. In operation, such as during decontamination of the plena 16 and 17, when the nozzle dam 30 is disposed in its sealing condition illustrated in FIG. 3, the pressure differential thereacross is such that the high pressure is exerted on the nozzle dam 30 in the direction of the arrow 35 in FIG. 3.

The outer seal assembly 40 is identical to that disclosed in the aforementioned copending U.S. application Ser. No. 651,419, reference to which may be had for a complete description of the structure. The outer seal assembly 40 includes a foldable circular seal plate or base 41, having a center section 42 hingedly connected to two side sections 52, respectively, by two piano-type hinge assemblies 60, to accommodate pivotal movement of the side sections 52 with respect to the center section 42 between a flat, unfolded sealing condition, illustrated in the drawings, and a folded condition (not shown). The seal plate 41 is held in its flat sealing condition by four latch assemblies 65 (two shown).

The seal assembly 40 also includes an inflatable seal 70, including an inflatable bladder 71 extending generally circumferentially around the seal plate 41. Fixedly secured to the bladder 71 and projecting radially outwardly therefrom around the entire circumference thereof is a seal or bearing member 74, formed of a compressible resilient material, such as expanded, closed cell foam EDPM. Upon inflation, the bladder 71 expands radially outwardly to drive the seal member 74 into frictional sealing engagement with the cylindrical inner surface 23 of the associated nozzle 20 or 21. A flexible circular diaphragm 75 covers the inner side of the seal plate 41, the diaphragm 75 being secured at its outer peripheral edge to a cylindrical attachment bracket 76 carried by the bladder 71.

The inner seal assembly 90 is similar to the outer seal assembly 40, but has a slightly larger diameter. More specifically, referring in particular to FIGS. 2-4, the seal assembly 90 includes a foldable circular seal plate or base 91, having a center section 92 hingedly connected to two side sections 102. The center section 92 is provided with two parallel side walls 93 (FIG. 3), interconnected at their opposite ends by two arcuate end walls 94 (FIG. 2). Spanning the side walls 93 centrally thereof along the inner side of the center section 92 is a transverse web 95, which intersects a longitudinal web 96 disposed perpendicular thereto and spanning the arcuate end walls 94. Integral with the web 96 adjacent to each end thereof are pairs of built-up areas in the form of outwardly diverging webs 96a. Integral with each of the side walls 93 and projecting laterally inwardly therefrom along the outer surface of the center section 92 are a pair of spaced-apart coupling blocks 97, each having a cylindrical socket 98 formed therein (see FIG. 4). Respectively formed in the outer surfaces of the side walls 93 are two seal grooves (not shown), each extending substantially the entire length of the side wall 93 and having inturned end portions respectively adjacent to the opposite ends of the side wall 93. Respectively received in the seal grooves are two resiliently compressible hinge seals (not shown).

The two side sections 102 are substantially identical, so that only one will be described in detail. Each of the side sections 102 has an elongated straight side wall 103 (FIG. 3), the opposite ends of which are interconnected by an arcuate outer wall 104 (FIG. 2), the walls 103 and 104 being interconnected by a pair of radially-extending webs 105 along the inner surface of the side section 102. Integral with the side wall 103 along its inner edge and projecting laterally inwardly therefrom substantially perpendicular thereto is an attachment flange 106 (FIG. 3) extending substantially the entire length of the side wall 103.

The two side sections 102 are respectively disposed along opposite sides of the center section 92, with the side walls 103 respectively disposed for back-to-back mating engagement with the side walls 93 along parting planes which define parallel chords of the circular seal plate 91, when the seal plate 91 is disposed in its flat, unfolded sealing condition illustrated in the drawings. It will be appreciated that, in this condition, the arcuate end walls 94 of the center section 92 and the arcuate outer walls 104 of the side sections 102 cooperate to define a substantially continous cylindrical wall extending around the entire circumference of the seal plate 91. Each of the arcuate end walls 94 and outer walls 104 is provided at its inner and outer edges with a pair of radially outwardly extending peripheral flanges 107 (one shown in FIGS. 2 and 3), cutouts 108 being formed in the inner one of the flanges 107 adjacent to the ends of the side walls 93 and 103 (FIG. 2).

The center section 92 is connected, respectively, to the two side sections 102 by two hinge assemblies 60. Each of the hinge assemblies 60 comprises a piano-type hinge including a pair of hinge plates 61 (FIG. 2), respectively mounted on the attachment flanges 101 and 106 of the side walls 93 and 103 on the inner or high pressure side of the seal plate 91. Each of the hinge plates 61 has a plurality of longitudinally spaced-apart aligned bushings 62, arranged so that the bushings of the two hinge plates 61 interleave for receiving therethrough an elongated hinge pin 63 (FIG. 3) to accommodate pivotal movement of the side sections 102 with respect to the center section 92 between a flat, unfolded sealing condition, illustrated in the drawings, and a folded position (not shown). With regard to its foldability, the seal plate 91 is substantially the same as the seal plate 41, described above. The seal plate 91 is held in its flat sealing condition by latch assemblies 65 (FIGS. 3 and 4).

The seal assembly 90 also includes an inflatable seal 110 (FIG. 3), including an inflatable bladder 111 (FIGS. 2 and 3) extending generally circumferentially around the seal plate 91. The bladder 111 is provided with an attachment web 112 which is disposed between the peripheral flanges 107 and secured in place by clip angles 113 (FIG. 2) at the ends of each of the cutout portions 108. Fixedly secured to the bladder 111 and projecting radially outwardly therefrom around the entire circumference thereof is a seal or bearing member 114, formed of a compressible resilient material, such as expanded, closed cell foam EDPM. Upon inflation, the bladder 111 expands radially outwardly to drive the seal or bearing member 114 into frictional sealing engagement with the cylindrical inner surface 23 of the associated nozzle 20 or 21 (see FIG. 3).

A flexible circular diaphragm 115 covers the inner or high pressure side of the seal plate 91, including the hinge assemblies 60, the diaphragm 115 being secured at its outer peripheral edge to a cylindrical attachment bracket 116 carried by the bladder 111 (FIG. 3). Integral with the diaphragm 115 and projecting inwardly therefrom are a plurality of bushings (not shown) respectively disposed for alignment with complementary apertures (not shown) through the center section 92 of the seal plate 91, for a purpose to be explained more fully below.

It will be appreciated that the outer seal plate or base 41 has webs (not shown) which correspond to the webs 95, 96, 96a and 105 of the seal plate 91. In each of the seal assemblies 40 and 90, these webs cooperate with the associated seal plate 41 or 91 to define a plurality of cavities or voids. Preferably, these voids are filled with appropriately shaped blocks of void filler material 118, such as an expanded, closed cell EDPM rubber. This void filler material 118 serves to cooperate with the webs to provide a substantially planar top surface for the seal assembly 40 or 90 which affords a uniform backing support for the associated diaphragm 75 or 115.

Integral with the outer surface of the seal plate 91 substantially around the entire perimeter thereof and extending radially outwardly therefrom is a flat annular seal guard 120 which overlies the bladder 111. Carried by the center section 92 of the seal plate 91 are two pairs of support tabs 125, respectively disposed at opposite ends of the center section 92. Each of the support tabs 125 is fixedly secured by suitable fasteners 126 to the outer or low pressure side of the center section 92 and projects generally radially outwardly therefrom in cantilever fashion, the support tabs 125 of each pair being spaced apart circumferentially of the center section 92, as is best illustrated in FIG. 4. Each of the support tabs 125 may be provided at the distal end thereof with an inclined bearing surface 127 (FIG. 4) disposed for engagement with the frustoconical inner surface 25 of the nozzle 20 to limit the depth of insertion of the nozzle dam 30 therein, as will be explained more fully below.

As indicated above, the center section 92 is provided with a plurality of apertures therethrough, two of which respectively communicate with adapter elbow fittings 130, each having an attachment flange 131 fixedly secured to the inner surface of the center section 92 by suitable threaded fasteners (not shown). Each of the adapter fittings 130 is coupled to an associated source (not shown) of pressurized fluid, such as compressed air, by a check valve and a quick-disconnect coupling (not shown). One of the adapter fittings 130 also communicates at the inner surface of the center section 92 with an inflation conduit (not shown) which, in turn, communicates with the inflatable bladder 111 through an inflation aperture therein.

Referring in particular to FIG. 3, interconnection between the outer and inner seal assemblies 40 and 90 is provided by the coupling assembly 140, the details of which are disclosed in the aforementioned U.S. application Ser. No. 651,419. More specifically, the coupling assembly 140 includes inner and outer tubes 141 and 146 which are respectively received through the central bushings of the diaphragms 75 and 115. The inner ends of the tubes 141 and 146 are respectively connected to the male and female portions of a quick-disconnect coupling 152 for joining the inner and outer ends of the coupling assembly 140. The quick-disconnect coupling 152 is of standard construction, having a male portion receivable in a resiliently retractable female socket portion.

Fixedly secured to the inner tube 141 is a clamp 153 which carries an outwardly extending aligning rod 154, disposed parallel to the axis of the tube 141, and having the distal end thereof disposed to be received in the clevis portion of a clevis clamp 155, which is fixedly secured to the outer tube 146. Fixedly secured to the clamp 153 and projecting therefrom parallel to the aligning rod 154 but on the opposite side of the coupling assembly 140 therefrom, is an elongated slide bar 158. The quick-disconnect coupling 152 is adapted to be operated by an actuator assembly 160 from the exterior of the nozzle dam 30. The actuator assembly 160 is described in U.S. application Ser. No. 651,419.

In use the outer and inner seal assemblies 40 and 90 are also interconnected by the support post assemblies 170, four of which are preferably provided in a rectangular arrangement for interconnecting the center sections 42 and 92 of the seal assemblies 40 and 90. The support post assemblies 170 are substantially identical to those described in U.S. application Ser. No. 651,419, and are movable between support and release positions.

The operation of the nozzle dam 30 will now be described in detail. Initially, the seal assemblies 40 and 90 are disconnected from each other and are separately inserted through the associated manway 19. For this purpose, the support post assemblies 170 are disposed in their release positions. The seal plate 41 is folded in a manner which is described more fully in the aforementioned copending application Ser. No. 651,419. The seal plate 91 is folded in a similar manner, i.e, the side sections 102 are folded over the inner or high pressure side of the center section 92 by reason of the hinge assemblies 60 being disposed on the high pressure side of the seal plate 91.

Once inside the vessel 11, the parts of the nozzle dam 30 are assembled to the configuration illustrated in FIG. 3. First of all, the seal plates 41 and 91 are unfolded to their flat sealing conditions, and are latched in this condition by the latch assemblies 65. Next, the seal assemblies 40 and 90 are joined together. More specifically, the seal assemblies 40 and 90 are then arranged substantially parallel to each other and are rotated until the aligning rod 154 is disposed to be received in the clevis opening of the clevis clamp 155. In this arrangement the tubes 141 and 146 of the coupling assembly 140 will be coaxially aligned as will the parts of the support post assemblies 170. The two halves of the quick-disconnect coupling 152 are then pressed together for completing the coupling assembly 140, thereby securely to join the seal assemblies 40 and 90 together. The connecting tubes of the support post assemblies 170 are then pivoted to their support positions. The nozzle dam 30 is now completely assembled and is ready for mounting in the nozzle 20. It will be appreciated that in this assembled condition the coupling assembly 140 forms a conduit providing communication between the inflation conduit of the outer seal assembly 40 and the source of pressurized air.

In the mounting operation, a worker grasps the nozzle dam 30, and inserts it into the nozzle 20 from the inner end thereof, the outer seal assembly 40 being inserted first. The insertion is continued until the bearing surfaces 127 of the support tabs 125 engage the frustoconical inner surface 25 of the nozzle 20. When all the support tabs 125 are firmly in engagement with the frustoconical inner surface 25, the nozzle seal is accurately disposed in its sealing position, with the seal plates 41 and 91 substantially perpendicular to the axis of the nozzle 20.

It is preferable that the inflatable seal 70 be inflated first to prevent creep upon inflation of the inflatable seal 110. Thus, at this point, the adapter fitting 130 which is in communication with the coupling assembly 140 is coupled to the associated source of pressurized air for inflation of the inflatable seal 70 of the outer seal assembly 40. This inflation pushes the seal member 74 radially outwardly into firm sealing engagement with the cylindrical inner surface 23 of the nozzle 20, providing a secure fluid-tight seal around the entire circumference of the seal assembly 40 and also serving firmly to anchor the nozzle dam 30 in place. The seal member 74 cooperates with the diaphragm 75 to provide an effective fluid-tight seal completely closing the cylindrical portion 22 of the nozzle 20.

Once the outer inflatable seal 70 has been inflated, the other adapter fitting 130 may be coupled to the source of pressurized air, for inflation of the inflatable seal 110. This inflation operates in the same manner as was described above with respect to the seal assembly 40, for effectively sealing the inner seal assembly 90 to the frustoconical portion 24 of the nozzle 20 around the entire circumference thereof. Thus, there is provided a dual seal arrangement, with the seal assembly 90 forming the primary seal and the seal assembly 40 forming a secondary seal.

As explained previously, when the nozzle dam 30 is disposed in its sealing condition illustrated in FIG. 3, the pressure differential across the nozzle dam 30 is such that the high pressure side is the inner side, so that pressure is exerted on the nozzle dam 30 in the direction of the arrow 35. A significant aspect of the invention is that, since the support tabs 125 are disposed only on the center section 92 of the inner seal plate 91, all the wedging force between the support tabs 125 and the frustoconical inner surface 25 of the nozzle 22 is exerted on the anchored center section 92. This effectively prevents the side sections 102 from tending to fold up onto the center section 92 in response to the pressure, which could result in significant leakage. The location of the support tabs 125 on the outer side of the seal plate 91 causes them to cooperate with the fasteners 126 and the seal plate 91 as first class levers. This provides a more secure mounting than if the support tabs 125 were on the inner side of the seal plate 91, in which case they would act as second class levers, putting more stress on the fasteners 126. Furthermore, because the diaphragm 115 is mounted on the high pressure side of the seal plate 91, it is fully supported by the seal plate 91 and the void filler material 118 thereof, thereby effectively preventing excessive flexure and stress in the diaphragm 115 and leakage which could result therefrom.

When it is desired to remove the nozzle dam 30, removal is effected in the manner described in U.S. application Ser. No. 651,419.

From the foregoing, it can be seen that there has been provided an improved nozzle dam which provides an effective seal of a nuclear steam generator vessel nozzle, by providing dual seals of the foldable plate and diaphragm type, wherein both diaphragms are fully supported against undue flexure and stress, while still accommodating folding of the seal plate sections and stable maintenance of the seal plates in their flat sealing configurations in use.

I claim as my invention:

1. A nozzle dam for preventing fluid flow under pressure through a primary fluid nozzle in the plenum of a nuclear steam generating vessel, wherein the nozzle has an inner surface with a circularly cylindrical portion and a frustoconical portion, said nozzle dam comprising: first and second seal means each including a plurality of foldably interconnected sections, coupling means directly interconnecting one of said sections on said first seal means with a corresponding section on said second seal means independently of any other section, and support means only on said one section of one of said seal means disposed for supported engagement with the frustoconical portion of the inner surface of the nozzle for cooperation with said coupling means to support said first and second seal means in sealing conditions extending across and closing the nozzle, said seal means being responsive to pressurized fluid for urging said support means more firmly into supported engagement with the inner surface of the nozzle.

2. The nozzle dam of claim 1, wherein said support means comprises a plurality of support tabs extending outwardly from said one section.

3. The nozzle dam of claim 2, wherein said support means includes two pairs of said tabs respectively extending laterally from opposite sides of said one section.

4. The nozzle dam of claim 2, wherein said first seal means is disposed in use at the high pressure end of the nozzle dam and said tabs are fixedly secured to the low pressure side of said one section and extend laterally therefrom in cantilever fashion.

5. The nozzle dam of claim 1, wherein each of said seal means includes a center section and two side sections foldable with respect to said center section, said support means being disposed on said center section.

6. The nozzle dam of claim 5, wherein each of said first and second seal means includes hinge means on the high pressure side thereof hingedly interconnecting said sections.

7. A nozzle dam for preventing pressurized fluid flow through a primary fluid nozzle in the plenum of a nuclear steam generating vessel, wherein the nozzle has an inner surface with a circularly cylindrical portion and a frustoconical portion, said nozzle dam comprising: first and second seal means respectively disposable in sealing conditions axially spaced-apart within the nozzle at opposite ends of the nozzle dam so that said first seal means is directly exposed to the fluid under pressure, coupling means interconnecting said first and second seal means in the sealing conditions thereof, each of said seal means including a base comprising a plurality of sections and hinge means on the high pressure side of said base foldably interconnecting said sections, each of said seal means including bearing means frictionally engageable with the inner surface of the nozzle around the entire circumference thereof when said seal means is disposed in its sealing condition, each of said seal means including a flexible fluid-impervious seal sheet overlying the high pressure side of said base and said hinge means and cooperating with said base and said bearing means to form a fluid-tight seal extending across and closing the nozzle, said seal sheet being supported by the associated base against deflection and stress, said coupling means directly interconnecting one of said sections on said first seal means with a corresponding section on said second seal means independently of any other section, and support means only on said one section of one of said seal means disposed for supported engagement with the frustoconical portion of the inner surface of the nozzle for cooperation with said coupling means to support said first and second seal means in their sealing conditions, said seal means being responsive to pressurized fluid for urging said support means more firmly into supported engagement with the inner surface of the nozzle.

8. The nozzle dam of claim 7, wherein each of said seal means includes a center section and two side sections foldable with respect to said center section.

9. The nozzle dam of claim 8, wherein said support means are carried by said center section.

10. The nozzle dam of claim 7, wherein said coupling means includes a plurality of parallel posts interconnecting said first and second seal means and extending in use substantially parallel to the axis of the nozzle.

* * * * *